(12) United States Patent
Buchon et al.

(10) Patent No.: US 8,999,210 B2
(45) Date of Patent: Apr. 7, 2015

(54) METHOD OF MANUFACTURING A LENS FOR PROVIDING AN OPTICAL DISPLAY

(75) Inventors: Cédric Buchon, Charenton-le-Pont (FR); Gérard Gelly, Charenton-le-Pont (FR); Vincent Roptin, Charenton-le-Pont (FR); Antoine Videmann, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 418 days.

(21) Appl. No.: 13/517,374

(22) PCT Filed: Jan. 13, 2011

(86) PCT No.: PCT/EP2011/050382
§ 371 (c)(1),
(2), (4) Date: Oct. 8, 2012

(87) PCT Pub. No.: WO2011/095379
PCT Pub. Date: Aug. 11, 2011

(65) Prior Publication Data
US 2013/0200540 A1  Aug. 8, 2013

(30) Foreign Application Priority Data
Feb. 4, 2010  (EP) .................................... 10305112

(51) Int. Cl.
*B29D 11/00* (2006.01)
*G02B 27/01* (2006.01)
*G02C 7/08* (2006.01)
*G02B 6/00* (2006.01)

(52) U.S. Cl.
CPC ...... *B29D 11/00432* (2013.01); *G02B 27/0101* (2013.01); *G02C 7/08* (2013.01); *G02C 7/086* (2013.01); *G02B 6/00* (2013.01)

(58) Field of Classification Search
None
See application file for complete search history.

(56) References Cited

U.S. PATENT DOCUMENTS

| 4,220,400 | A | 9/1980 | Vizenor |
| 6,554,421 | B1 * | 4/2003 | Billard et al. ................... 351/41 |
| 2003/0165017 | A1 | 9/2003 | Amitai |
| 2007/0070859 | A1 | 3/2007 | Hirayama |
| 2008/0273246 | A1 | 11/2008 | Moliton et al. |

FOREIGN PATENT DOCUMENTS

WO  2008045137  4/2008

* cited by examiner

*Primary Examiner* — Benjamin Schiffman
(74) *Attorney, Agent, or Firm* — Sofer & Haroun, LLP

(57) ABSTRACT

The invention concerns a method of manufacturing a lens (1, 2) that has a front face and a rear face, and into which light beams emitted by an optical element of a light beam generator system (IB) are introduced via an entry surface (Si) and directed towards the eye of the wearer to enable information content to be viewed, by means of a transparent optical insert (IA, 2A, I) constituted by a light guide, said insert (I) being with a form substantially identical to the form of a final lens suitable for being positioned in a frame (3) of a support. According to the invention, the method comprises the following steps: manufacturing said insert (I) with a form smaller than the form of said final lens according to a proportional transformation, manufacturing a lens blank (LB) by association of plastic material forming said front face and said rear face with said insert (I) and cutting said lens blank (LB) around said insert (I) and with a distance from the edges of said insert which is around 1 mm for at least 50% of the periphery of said insert.

5 Claims, 3 Drawing Sheets

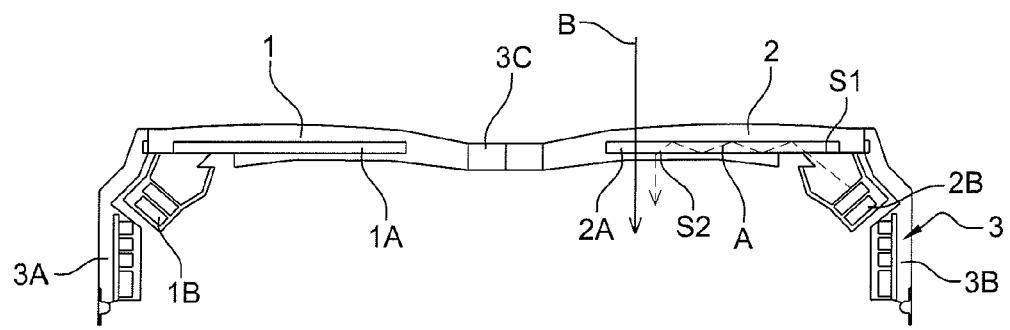
Fig. 1
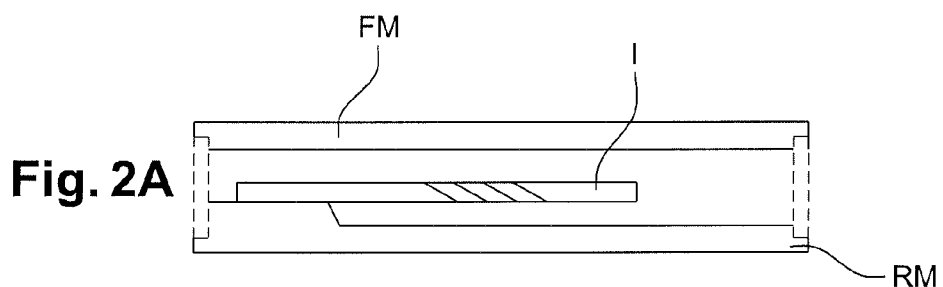
Fig. 2A
Fig. 2B
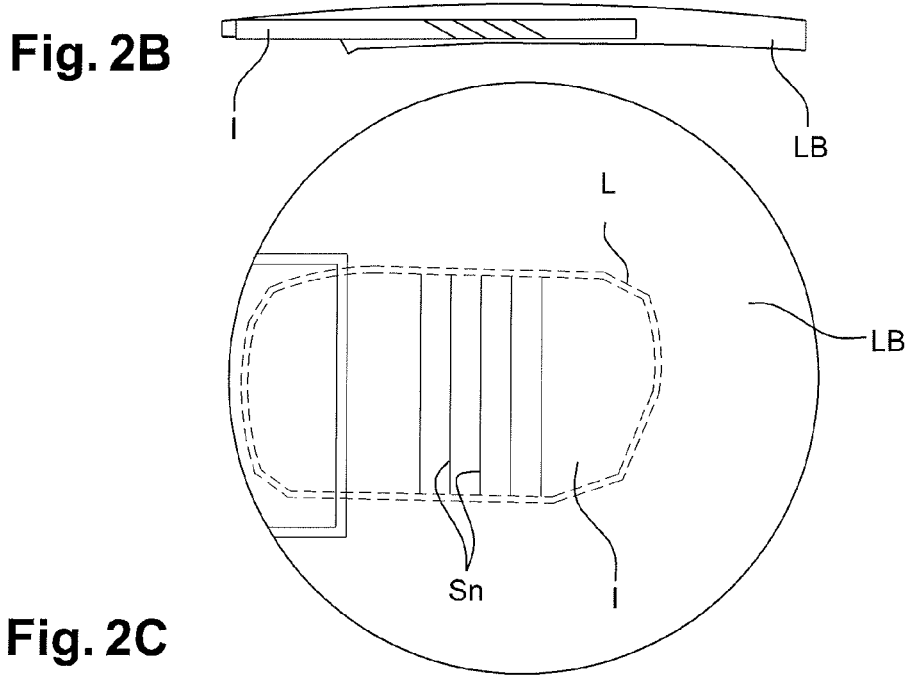
Fig. 2C

METHOD OF MANUFACTURING A LENS FOR PROVIDING AN OPTICAL DISPLAY

RELATED APPLICATIONS

This application is a National Phase application of PCT/EP2011/050382, filed on Jan. 13, 2011, which in turn claims the benefit of priority from European Patent Application No. 10 305 112.4, filed on Feb. 4, 2010, the entirety of which are incorporated herein by reference.

BACKGROUND

1. Field of the Invention

The present invention relates to a method of manufacturing a lens for making an optical display by means of an optical imager designed to allow access to information through optical projection of a digital image, for example of multimedia type or data type, for example GPS data.

2. Description of Related Art

The term "lens" is used herein to designate an optical system suitable in particular for being positioned in a frame for spectacles or eyeglasses. This term "lens" is used herein to mean a finished lens ready for placing on a spectacles frame, or an unfinished lens or lens blank, i.e. which still needs to be cut by trimming, surfacing and polishing, in order to be usable.

Patent document WO 01/95027 discloses a projection insert constituted by an optical imager for forming the light beams coming from an electronic and optical system for generating light beams based on an electronic signal, the system being of the miniature screen, laser diodes, or light-emitting diodes (LED) type. The optical imager directs the light beams towards the wearer's eye to enable the information content to be viewed, as a virtual image.

This prior art optical imager includes a light-transmitting mineral, substrate, specially made of glass, a wave-reflecting substrate surface carried by the substrate for coupling light from a entry surface into the substrate by total reflection and a plurality of partially reflecting surfaces carried by the substrate and parallel to each other and not parallel to any of the edges of the substrate in order to direct the light beams towards the wearer's eye.

Because this type of display enables an optical imager to be obtained of small thickness, especially of around 2 mm or lower, it achieves a compromise between the display function and the vision correction function. The faces of the lens can be involve in both functions, so for example it is possible to change the radius of curvature of one face for vision-correction reasons without disturbing the display function.

The patent document WO 2006/016086 proposes a method of manufacturing an optical display that can also correct the vision of a user, while being mass-produced in reliable manner, by decoupling the display and the vision-correction functions.

To this end, this patent document provides a method of manufacturing a vision-correction lens that has a front face and a rear face, and into which light beams emitted by an optical light beam generator system are introduced via an entry surface and directed towards the eye of the wearer to enable information content to be viewed, said light beams being reflected a plurality of times between two reflection faces, between being introduced into the lens and exiting therefrom, said two reflection faces being faces of a transparent optical insert constituted by a light guide.

This insert is completely contained within the lens by placed it in the lens blank while it is being molded in a mold comprising a first mold portion for molding the front face, and a second mold portion for molding the rear face and a monomer is casted into this mold, in order to obtain a circular lens blank which is then treated by surfacing and polishing and cut by trimming to the form of the finished lens ready for placing on a spectacles frame.

According to this known process, the insert is rectangular, with for example a length of 43 mm and a width of 20 mm. Consequently, its surface is smaller than the cut total surface of the final lens.

Such method raises the following technical problem. Because of the mechanical solicitations created between the glass of the insert and the monomer of the lens blank during the heated casting of the monomer and revealed by the mechanical efforts resulting from the surfacing and the polishing of the lens blank, it appears an optical defect in the vicinity of the edges of the insert. This defect gives a loss of the qualities of transmission of the lens and a variation of the optical powers in these zones.

In order to solve this problem, it can be consider an insert which presents a surface greater that the surface of the final lens and after placing of the monomer constituting the lens blank, the final lens can be cut by trimming at its dimension.

The patent document EP 1 748 305 proposes such process where the surface of the final insert is equal to the surface of the final lens, the insert being a plane substrate stacked in close contact between two other plane substrates serving a function of diopter correction of the viewing eye, one disposed on the external side and one disposed on the viewer side.

In order to manufacture such optical display, an blank insert having for example a length of 57 mm and a width of 35 mm and two blank plane substrates with the same surface dimension are stacked with the insert, surfaced, polished and cut by trimming to the form of the finished lens ready for placing on a spectacles frame. Such method gives an insert extending on all the surface of the final lens.

Such method raises the following technical problem. The cutting has to be done inside a width which comprises two materials, glass for the insert and plastic material for the two plane substrates. These two materials have a very different hardness and the cutting by trimming is very difficult to do, causing separation, break or splitting of the materials.

Objects and Summary

The invention solves these problems by providing a method of manufacturing an optical display that can eventually correct the vision of a user, while being mass-produced in reliable manner, and which provides perfect optical transmission and easy manufacturing.

Although the preferred application of the process according to the invention concerns the manufacturing of a vision-corrective lens, it can be applied to a lens without vision-correction functions including such optical insert, in order to obtain an optical display positioned in a frame for spectacles or eyeglasses or equivalent support.

To this end, the invention provides a method of manufacturing a lens that has a front face and a rear face, and into which light beams emitted by an optical element of a light beam generator system are introduced via an entry surface and directed towards the eye of the wearer to enable information content to be viewed, by means of a transparent optical insert constituted by a light guide, said insert being with a form substantially identical to the form of a final lens suitable for being positioned in a frame of a support, the method being characterized in that it comprises the following steps:

manufacturing said insert with a form smaller than the form of said final lens according to a proportional transformation, manufacturing a lens blank by association of plastic material forming said front face and said rear face with said insert and cutting said lens blank around said insert and with a distance from the edges of said insert which is around 1 mm for at least 50% of the periphery of said insert.

Said manufacturing of said lens blank can be made by molding the said plastic material around said insert.

In this first case, by applying the process according to the invention, the lens is homogeneous in transmission, since the areas of optical defects are released near the edge of the final shape of the lens, which minimizes the optical perturbation seen by the user through the lens.

Said manufacturing of said lens blank can be made by stacking in close contact the insert between two plane substrates.

In this second case, by applying the process according to the invention, the cutting is done only in the plastic material of the two plane substrates, suppressing the problem of different hardness, the zones of optical defect being removed and the precise mechanical reference of the glass insert being directly accessible on the final lens.

By means of the invention, the cutting by trimming can be made with classical machines of trimming.

BRIEF DESCRIPTION OF THE DRAWINGS

The invention is described with below in greater detail with the help of figures that show merely preferred embodiments of the invention.

FIG. 1 is a section schematic view of an ophthalmic binocular display according to the invention.

FIGS. 2A, 2B and 2C illustrate a process according to a first embodiment of the invention.

DETAILED DESCRIPTION

With reference to FIG. 1, an ophthalmic binocular display comprises two lenses 1, 2. Each lens contains a projection insert constituted by an optical imager 1A, 2A for shaping the light beams coming from an electronic and optical system 1B, 2B for generating light beams based on an electronic signal, the system being of the miniature screen, laser diodes, or light-emitting diodes type. The optical imager directs the light beams towards the wearer's eye from an entry surface $S_1$ towards an exit surface $S_2$, to enable the information content to be viewed as illustrated on right lens with dots arrow A. The lenses permit see-through, i.e. the vision of the environment as illustrated on right lens with arrow B.

The lenses 1, 2 are mounted in a frame 3 for spectacles or eyeglasses comprising two support branches 3A, 3B and a nose support 3C.

FIGS. 2A, 2B and 2C illustrate a process according to a first embodiment of the invention.

As described in the patent document WO 2006/016086, the insert I is completely contained within the lens by placed it in the lens blank while it is being molded in a mold comprising a first mold portion FM for molding the front face, and a second mold portion RM for molding the rear face and a monomer is casted into this mold, in order to obtain a circular lens blank LB which is then treated by surfacing and polishing and cut by trimming to the form of the finished lens ready for placing on a spectacles frame.

The invention consists of manufacturing the insert I with a form substantially identical to the form of a final lens suitable for being positioned in a frame for eyeglasses, but smaller than the form of the final lens, illustrated by a dot line L in the FIG. 2C, according to a proportional transformation, manufacturing the lens blank by association of plastic material forming the front face and the rear face with the insert, as detailed here above, and cutting by trimming the lens blank around the insert along said dot line L with a distance from the edges of the insert 1 which is around 1 mm for all the periphery of the insert, according to the FIG. 2C.

FIGS. 3A, 3B, 3C and 3D illustrate a process according to a second embodiment of the invention.

As described in the patent document EP 1 748 305, the insert I is stacked in close contact between two other plane substrates FS, RS serving a function of diopter correction of the viewing eye, one disposed on the external side and one disposed on the viewer side.

Figure 3A:
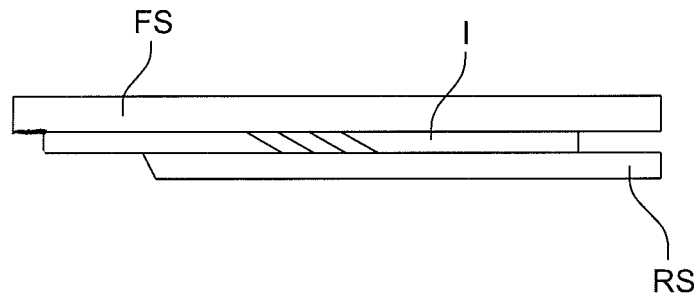
FIGS. 3A, 3B, 3C and 3D illustrate a process according to a second embodiment of the invention.
Figure 3B:
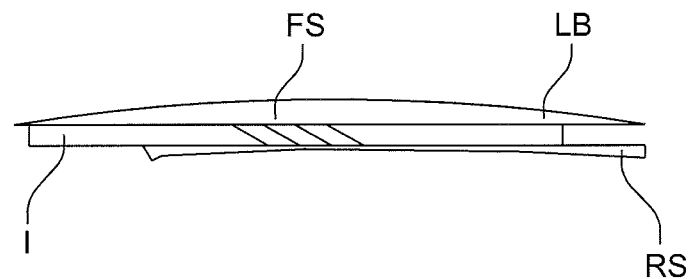
Figure 3C:
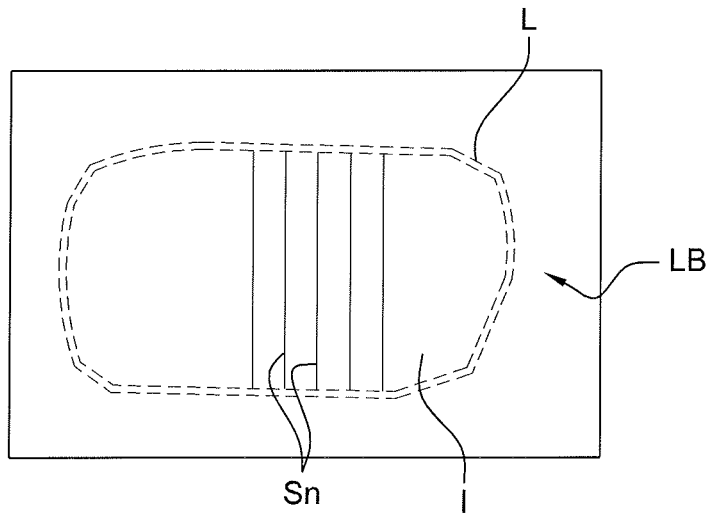

The invention consists of manufacturing the insert I with a form substantially identical to the form of a final lens suitable for being positioned in a frame for eyeglasses, but smaller than the form of the final lens, illustrated by a dot line L in the FIG. 3C, according to a proportional transformation, manufacturing the lens blank by adhesion of plastic material forming the front face and the rear face with the insert, as detailed here above, and cutting by trimming the lens blank around the insert along said dot line L with a distance from the edges of the insert 1 which is around 1 mm for all the periphery of the insert, according to the FIG. 3C.

Figure 3D:
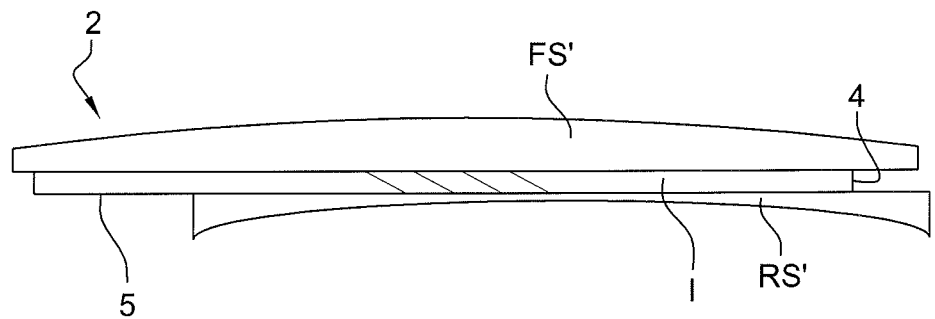

The FIG. 3D illustrates a lens produced by trimming as described in FIG. 3C. The reference of the glass insert is directly accessible on the final lens.

After cutting by trimming according to preceding embodiment, surfacing, polishing and treatment of the lens blank, the edges of the final lens 1, 2, present automatically, without specific working, a groove 4 between the two treated substrates FS', RS' with the edges of the optical insert I forming the base of the groove. This groove 4 has a width of around 2 mm and a depth of around 1 mm and assures a direct access to the optical insert I, which is placed with a great precision in view of a good transmission of the light beam to the eye of the wearer, and the possibility of a precise mechanical reference.

According to this embodiment, the final lens present two direct accesses to the optical insert I, the base of the groove 4 which is a lateral face of the insert I, and the front surface 5 of the insert I on the other lateral side of the final lens I. These direct accesses assure precise mechanical references.

According to the embodiments described here above, the frame 3 is classical, i.e. with parts supporting the lens which are closed and all around the lenses. There are some other frames which do not comprise these closed parts, the branches and the nose support being directly fixed on the lenses by means of screws for example.

Figure 4:
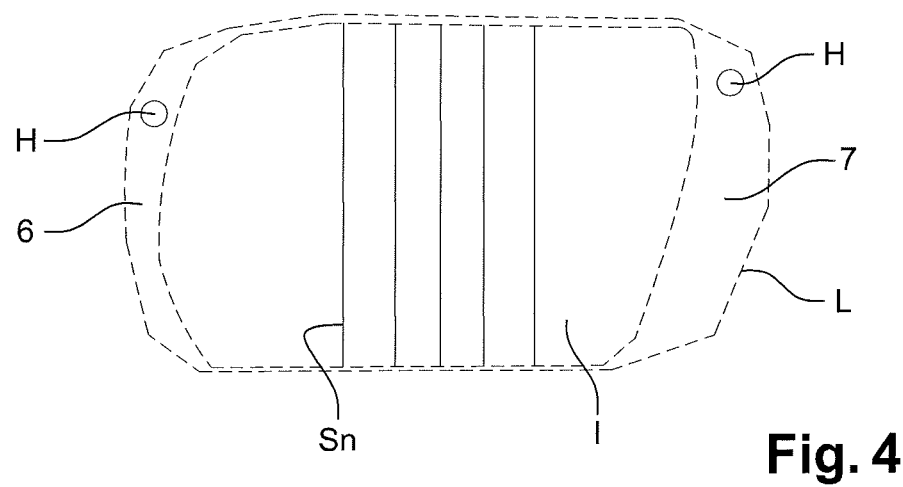
FIG. 4 is a front view of a variant according to the invention.

In such case, the distance between the shape of the insert I and the shape of the final lens can be larger than 1 mm for specific regions of the periphery of the insert, according to the FIG. 4. These specific regions 6, 7 correspond to the place of the arrangements of fixing of the branches and the nose support, for example holes H for fixing screws, where the cutting by trimming of the lens blank is made around the insert with an according greater distance from the edges of the insert, in order to permit the drilling of these holes H only in the plastic material.

In fact, in case of such direct fixing of the branches and of the nose support in the lens, such specific regions 6, 7 correspond to periphery portions which are disposed on a part smaller than 50% of all the periphery of the lens and the process here above detailed is applied on at least 50% of the periphery of the insert I.

Preferably, the projection insert I is in the type of the insert described in the patent document WO 01/95027 and could have a thickness of around 2 mm.

This optical imager includes a light-transmitting substrate made of glass, a wave-reflecting substrate surface carried by the substrate for coupling light from a entry surface into the substrate by total reflection and a plurality of partially reflecting surfaces $S_n$ carried by the substrate and parallel to each other and not parallel to any of the edges of the substrate in order to direct the light beams towards the wearer's eye.

Of course, the optical insert I is manufactured with a great precision in view of a good transmission of the light beam to the eye of the wearer, by means of these reflecting surfaces $S_n$, according to the characteristics of the frame 3 and of the wearer.

The mechanical precision of said insert is also necessary as a mandatory reference particularly in case of binocular optical display where the mechanical reference of the said insert is used for the alignment of the two projected images.

The invention claimed is:

1. A method of manufacturing a lens the lens having a front face and a rear face, and into which light beams emitted by an optical element of a light beam generator system are introduced via an entry surface and directed towards the eye of the wearer to enable information content to be viewed, by means of a transparent optical insert constituted by a light guide, said insert being with a form substantially identical to the form of a final lens suitable for being positioned in a frame of a support, said method comprising the steps of:
    manufacturing said insert with a form smaller than the form of said final lens according to a proportional transformation,
    manufacturing a lens blank by association of plastic material forming said front face and said rear face with said insert; and
    cutting said lens blank around said insert and with a distance from the edges of said insert which is around 1 mm for at least 50% of the periphery of said insert.

2. A method according to claim 1, wherein said manufacturing of said lens blank is made by molding the said plastic material around said insert.

3. A method according to claim 1, wherein said manufacturing of said lens blank is made by stacking in close contact the insert between two plane substrates.

4. A method according to claim 1, adapted to a final lens supported by branches and/or a nose support, wherein the step of cutting said lens blank around said insert is made with a distance from the edges of said insert which is greater than 1 mm for forming at least a region of direct fixing of the branches and/or of the nose support in the final lens.

5. A method according to claim 1, wherein said light guide includes a light-transmitting substrate made of glass, a wave-reflecting substrate surface carried by the substrate for coupling light from said entry surface into the substrate by total reflection and a plurality of partially reflecting surfaces carried by the substrate and parallel to each other and not parallel to any of the edges of the substrate, in order to direct the light beams towards the wearer's eye.

* * * * *